Jan. 30, 1968 R. L. GARWIN ET AL 3,366,728

SUPERCONDUCTOR WIRES

Original Filed Sept. 10, 1962 3 Sheets-Sheet 1

INVENTORS
RICHARD L. GARWIN
ARTHUR S. NOWICK
DONALD P. SERAPHIM

BY Bernard N. Wiener
ATTORNEY

United States Patent Office 3,366,728
Patented Jan. 30, 1968

3,366,728
SUPERCONDUCTOR WIRES

Richard L. Garwin and Arthur S. Nowick, Scarsdale, and Donald P. Seraphim, Bedford Hills, N.Y., assignors to International Business Machines Corporation, New York, N.Y., a corporation of New York Original application Sept. 10, 1962, Ser. No. 222,396. Divided and this application May 24, 1966, Ser. No. 552,577

5 Claims. (Cl. 174—113)

ABSTRACT OF THE DISCLOSURE

A common shell covers a plurality of superconductive filaments which are each disposed in their own individual shell.

This application is a division of application Ser. No. 222,396, filed on Sept. 10, 1962, and now abandoned.

Certain superconductor metals and compounds, for example, $Nb_3Sn$, which is described in Physical Review Letters, Feb. 1, 1961, pages 89–91, are known to carry very large current densities in transverse magnetic fields as strong as 100,000 gauss. High magnetic fields are desirable in the performance of many scientific, technical or logical functions. Present day motors have a magnetic field of 16,000 gauss and the availability of essentially free magnetic fields of 100,000 gauss would allow the output of large generators and motors to be increased by a factor of ten without increasing the rotational speed of the generator or motor armatures or fields. Thus, the capital investment required for a given generating plant is greatly reduced with the availability of high magnetic fields. A high free field is of particular importance for controlling thermonuclear reactions. Steady state thermonuclear reactors are feasible due to the balance between the cost of the necessary magnetic field and the power produced from the reacting particles contained therein. With the availability of the high free magnetic field, thermonuclear reactions not only are feasible but also become practical.

Although metals and compounds such as $Nb_3Sn$ capable of carrying very large current densities in strong transverse magnetic fields are known, there are metallurgical problems which prevent these metals from being readily usable, such as, in the form of solenoids. Superconductor metals such as molybdenum-rhenium have some properties of steel and may be readily used but molybdenum-rhenium carries currents only in fields of the order of 15,000 gauss. Niobium-tin carries very large current in field of about 100,000 gauss but bulk niobium-tin is a very brittle compound and, therefore, is difficult to work with. If the superconductor material niobium-tin could be made ductile so as to be readily formed into coils or solenoids, power production about 10 times larger per unit volume of space supplied with magnetic fields would be possible. It is, therefore, of great importance to isolate the physical phenomenon responsible for the carrying of large currents in the peculiar physical form of say, the niobium-tin compound. It is believed that the filamentary structure found in niobium-tin is an important factor in the capability of this compound to remain superconductive in high magnetic fields.

It is known that filaments or thin films of superconductor materials are capable of carrying currents of a density of approximately ten million amperes per square centimeter in high magnetic fields. Critical fields of tin films have been also known to be increased by a factor of 30 over that of bulk tin. This feature of superconductivity has been referred to as the London theory and is more specifically, in one of its limiting forms, $$\frac{H_f}{H_b}=\frac{2\lambda\sqrt{3}}{d}$$

where $H_f$ is the critical field of the filament, $H_b$ is the critical field of the bulk material, $\lambda$ is the magnetic field penetration depth of the material, generally about 500 angstroms in pure superconductor metals, and $d$ is the diameter of the filament when $d$ has a value much less than that of $\lambda$.

It is further known that thin films of superconductive material in close proximity with normal materials lose their superconductivity.

It is an object of this invention to provide improved superconductor wires.

Still a further object of this invention is to provide an improved superconductor wire capable of carrying very large current density.

Yet another object of this invention is to provide an improved flexible superconductor wire capable of carrying large currents in fields as high as 100,000 gauss.

Still another object of this invention is to provide very fine superconductor wires.

In accordance with the present invention, superconductivity of a wire is controlled by placing a superconductor metal in intimate contact with an insulating or normal material, stretching the two materials, dividing the stretched or elongated materials into segments, forming the segments into a bundle and stretching the bundle to again reduce the diameter or thickness of the materials and repeating the above process until the superconductor material is at least aproximately as thin as the magnetic field penetration depth of the superconductor material.

An important advantage of this invention is that material capable of carrying large currents in high magnetic fields are artifically created from bulk material which normally has little or no filamentary structure.

An important feature of this invention is that alloys may be made by the stretching or drawing process out of two elements which together would not have mutual solid solubility.

The foregoing and other objects, features and advantages of the invention will be apparent from the following more particular description of preferred embodiments of the invention, as illustrated in the accompanying drawings.

Figure 1:
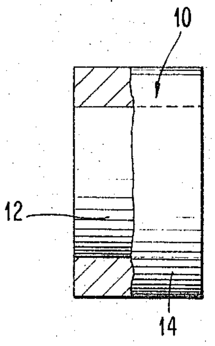
FIG. 1 illustrates, in a partly broken away side view, a bulk superconductor material surrounded by or clad with a normal material.

Referring to the drawings in more detail, there is shown in FIG. 1 a bar or rod 10 comprising a core or filament 12 surrounded by an outer shell 14. The core or filament 12 is a superconductor metal, for example, lead, and the shell 14 is made of a normal metal, i.e., a metal which is not in its superconducting state when used, which may be aluminum when the material of the bar 10 is to be used at a temperature below that of the superconducting temperature 7.2° K. of lead but above the superconducting temperature 1.1° K. of aluminum. The transverse cross section of the bar 12 and the shell 14 are preferably circular and the internal diameter of the shell 14 is preferably substantially equal to the diameter of the core 12.

Figure 2:
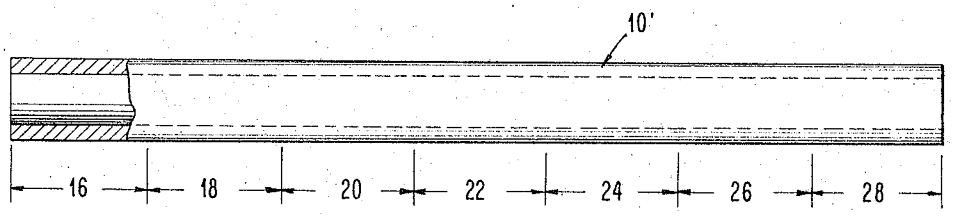
FIG. 2 shows the materials of FIG. 1 after a stretching process has been performed thereon.
Figure 3:
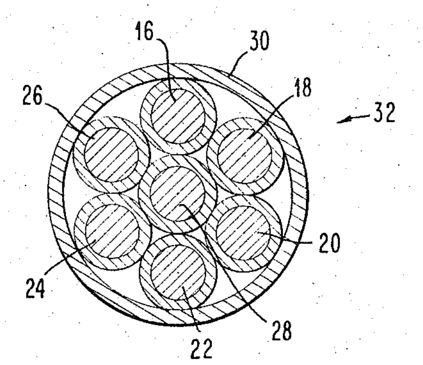
FIG. 3 shows a cross-sectional view of a bundle formed from segments of the elongated material of FIG. 2.

In FIG. 2 of the drawing there is shown the bar 10 of FIG. 1 in an elongated form and identified by reference numeral 10'. The bar 10' may have been stretched or drawn to the form indicated in FIG. 2 by any suitable known means, such as, by swaging or by drawing, for example, as described in French Patent No. 1,006,452 published Apr. 23, 1952 and entitled, "Very Fine Metallic Wires and Magnetic Product for High Frequencies," so as to simultaneously stretch the core 12 and the shell 14. The elongated bar 10' after being stretched to a desired length is divided into a plurality of segments 16, 18, 20, 22, 24, 26, and 28, or any other desired number of segments. The plurality of segments 16–28 are then stacked within a first common shell 30, preferably also made of aluminum, so as to form a first bundle 32 as indicated in FIG. 3, which shows a cross-sectional view of the bundle 32. A side view, partially broken away, of the bundle 32 shown in FIG. 3 is illustrated in FIG. 4 of the drawing.

Figure 4:
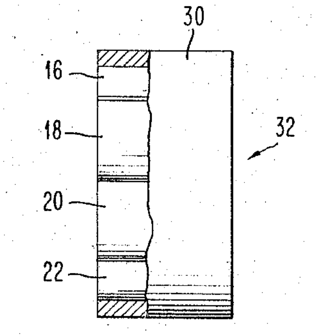
FIG. 4 is a side view, partially broken away, of the bundle illustrated in FIG. 3.
Figure 5:
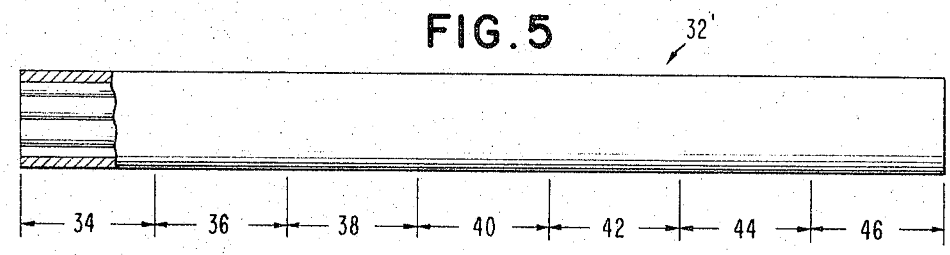
FIG. 5 illustrates a side view of the bundle shown in FIG. 4 after it has been stretched or drawn to a given length.
Figure 6:
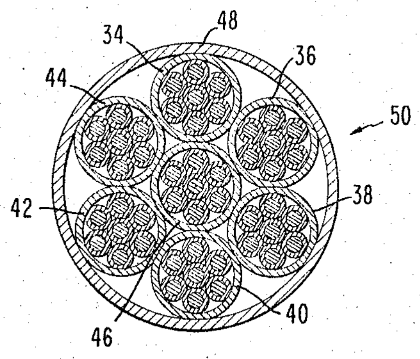
FIG. 6 is a cross section of a bundle made of a plurality of segments of the elongated bundle illustrated in FIG. 5.

FIG. 5 shows the bundle 32 of FIG. 4 after it has been stretched to a desired length. The bundle 32 in its elongated form is indicated by reference number 32' in FIG. 5. Bundle 32' may be divided into segments 34, 36, 38, 40, 42, 44, and 46, or into any other desired number of segments. The plurality of segments 34–46 are then stacked within a second common envelope 48 to form a second bundle 50 of the segments of the stacked bundle 32' as shown in a cross-sectional view in FIG. 6. A side view, partially broken away, of the second bundle 50 is illustrated in FIG. 7 of the drawing.

Figure 7:
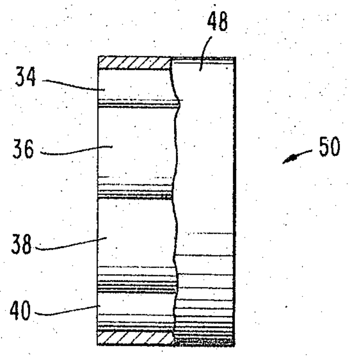
FIG. 7 is a side view, partially broken away, of the bundle shown in FIG. 6.
Figure 8:
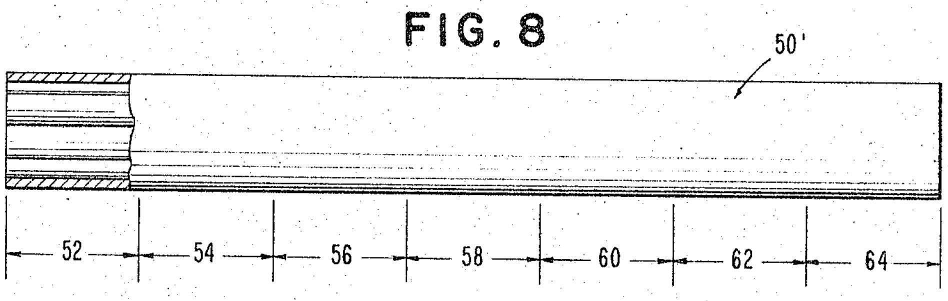
FIG. 8 is a side view, partially broken away, of the bundle illustrated in FIG. 7 after it has been stretched to a given length.

The second bundle 50 of FIG. 7 is stretched to a desired length to form an elongated bundle 50' shown in FIG. 8 of the drawing. The elongated bundle 50' may be divided into segments 52, 54, 56, 58, 60, 62, and 64, or into any desired number of segments. The plurality of segments 52–64 are then stacked within a third common shell 66 to form a third bundle 68 of the segments of the second elongated bundle 50'.

Although not illustrated in the drawing, it should be understood that the third bundle 68 can be stretched and then divided into segments to form an additional bundle and this process can be repeated for as many times as is desirable to provide a composite wire having millions and even billions of filaments therein, each filament having a diameter as small as only a few Angstrom units.

Although the shells and the cores or filaments within the segments are shown as having a substantially circular cross-sectional form, it should be understood that as the bundles are stretched the shells and the cores or filaments within a common shell are distorted so as to eliminate any air spaces which may have been originally formed between the shells. The distortion of the cross-sectional form of the core or filament and of the shell is clearly indicated by observation through an optical microscope. Furthermore, as the shells and bars or filaments are stretched further and further they tend to adhere to one another so as to provide in effect a single wire which may have an outside diameter of .5 mm. or less and a filamentary structure of superconductor material therein, wherein each filament has a diameter of 100 or less angstrom units.

Figure 9:
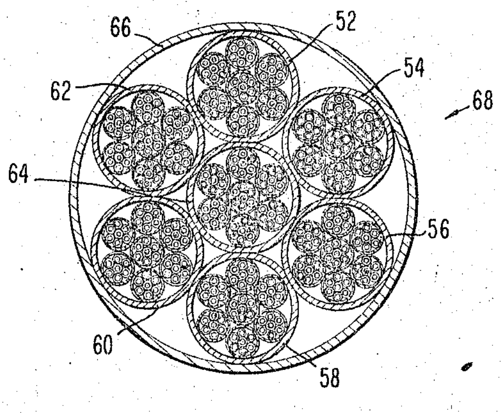
FIG. 9 is a cross-sectional view of a bundle of segments of the elongated multi-bundle illustrated in FIG. 8.

It should be further understood that the dimensions of the bars or filaments and shells shown in the figures of the drawing have been chosen to more clearly visualize the large reduction in the size of the diameter of the original bar 12 shown in FIG. 1 to that of the cores or filaments shown in FIG. 9 after three drawings. The actual diameter of each of the filaments after each of a plurality of drawings and the number of filaments within a bundle for two specimens are given in Table I wherein Table I*a* refers to a first bar or specimen comprising cores or filaments of lead and shells of aluminum in a given ratio of lead to aluminum and Table I*b* refers to a second aluminum-lead bar or specimen having a different ratio of lead to aluminum.

TABLE I

| | Draws | No. of Filaments | Filament Diameter, A. | Volume percent Pb |
|---|---|---|---|---|
| a | I | 1 | $6\times10^5$ | 56 |
| | II | 203 | $1.3\times10^5$ | 28 |
| | III | 53,000 | $7\times10^3$ | 14 |
| | IV | $4\times10^3$ | $7\times10^2$ | 7 |
| | V | $2.7\times10^8$ | 40 | 3.5 |
| b | I | 1 | $2.5\times10^5$ | 1.0 |
| | II | 286 | $1.1\times10^4$ | 0.77 |
| | III | 86,000 | $1.5\times10^3$ | 0.59 |
| | IV | $2.9\times10^6$ | 100 | 0.46 |

It can be seen from Table I*a* that after the fifth draw the composite wire had a filamentary structure comprising 270 million filaments each having a diameter of only 40 angstroms.

Although the lead is indicated in Table I as being only a few percent of the specimen after the final draw, it should be understood that by employing different ratios of lead to aluminum and by employing a particular program of drawing, the specimen after the final draw may be made to contain 50 percent or more of lead.

The critical magnetic field of bulk lead at 4.2° K. is 550 gauss. However, the resistive transitions of lead are extremely sensitive to cold work or to extremely dilute concentration of several impurities and often occur at magnetic fields as high as 800 gauss when the current density is low. It was found even after only two draws of the first aluminum-lead specimen that severe deformations of the filaments and shells within the common shell occurred but that the transition magnetic field was 550 gauss. After the third draw resistance began to appear at 410 gauss, which is substantially below the critical field of bulk lead, and the normal state of resistivity was not fully returned until after the magnetic field was increased to 1450 gauss. Thus, the lead fibers after the third draw, each of which have a diameter of 7000 angstroms, as stated in Table I*a*, began to show high field superconductivity. The increase in critical field is much larger than that expected from the consideration of filament sizes given in Table I and the London's well-known critical field equation wherein $\lambda$ and $d$ are comparable in magnitude. After the fourth draw the lead filaments had a diameter of 700 angstroms, as stated in Table I*a*, and at 4.2° K. the specimen appears partly normal at zero magnetic field while the normal state is not fully returned on increasing the magnetic field to 1000 gauss. Following the fifth draw the lead filament has a diameter of approximately 40 angstroms and the specimen has 78 percent of its normal state resistivity at 4.2° K. The resistance decreases with decreasing temperature until at 3.4° K. the specimen appears to be completely superconducting. Accordingly, it can be seen that two metals or elements which are not mutually soluble can be combined in accordance with the present invention to produce effectively a third material or alloy which has properties not found in either of the two original elements. It should be noted that the composite wire produced after the fifth draw became superconducting at 3.4° K. whereas lead becomes superconducting at 7.2° K. and aluminum becomes superconducting at 1.1° K.

The interaction between the aluminum and the lead which produces the alloying effect was confirmed by magnetization measurements indicating that a substantial fraction of the aluminum becomes superconducting at temperatures well above 1.1° K.

Heretofore, known cryogenic liquids, such as helium and nitrogen, have produced very low cryogenic temperatures of discrete values and cryogenic metals have been used in cryogenic technology which have superconducting properties at discrete temperature values. In accordance with one aspect of the invention superconductor wires are provided which are superconductive at any one of a large range of cryogenic temperatures. These wires may be preferably adjusted in many instances so as to be superconductive at a temperature just below the temperature of a desired cryogenic liquid to, for example, enhance switching when the novel wires are used in superconductive circuits such as cryotrons.

It can be seen that the lead filaments in the aluminum interact with the aluminum to more or less average the superconducting properties of the synthetic mixture. Since X-ray data after the fifth draw confirms the presence of lead in its own lattice and aluminum also in its own lattice and in neither material is there any indication of atomic interpenetration of the other element, it may be inferred that the interaction is primarily an electronic interaction; that is, only electrons go from one lattice to another. It also may be inferred that the electronic interaction is to be associated with interpenetration and relatively free interchange of the electrons between the two lattices. Since the electron mean free path in both pure lead and in pure aluminum is much larger than the filament diameter and since the pairing interaction between electrons giving rise to superconductivity also takes place in pure materials over distances $10^3$ to $10^4$ angstroms, superconductivity is allowed to spread from the lead into the aluminum and alternatively the normal metal effect at 4.2° K. spreads into the lead filaments. Due to these factors the critical temperature of the lead filaments is depressed by the proximity of the aluminum. In a similar manner the aluminum is superconducting at temperatures abnormally higher than the critical temperature of bulk aluminum and contributes a susceptibility comparable to the volume of the entire specimen of lead and aluminum used.

To provide a synthetic alloy in accordance with the present invention which has a higher critical field than the critical field of the bulk superconducting material used to form the filaments, it is necessary to prevent or decrease the free interchange of electrons between the superconducting filament and normal material shell. One method of decreasing the free interchange of electrons is to decrease the electron mean free path in both the material of the shell and the material comprising the filaments. In addition the magnetic field penetration depth is known to increase rapidly with decreasing electronic mean free path. Thus, in accordance with the London equation herein above stated, even higher critical magnetic fields are available if the mean free path is decreased in shell material and filament material.

Thus, in order to provide high magnetic field superconductors in accordance with the present invention, each of the shells illustrated in the figures of the drawings are made with normal metal alloy having a short mean free path or a good insulator. In the limit of using insulator shells where the electron mean free path is infinitely short, the filaments are completely isolated and have critical fields in accordance with the London equation stated hereinabove.

The method for making the high magnetic field superconductor wires is similar to that described here and above in connection with FIGURES 1 to 9 of the drawings, differing therefrom only in that each shell shown in FIGURES 1 to 9 are made of insulator materials rather than the metallic or aluminum materials indicated in the drawings.

Figure 10:
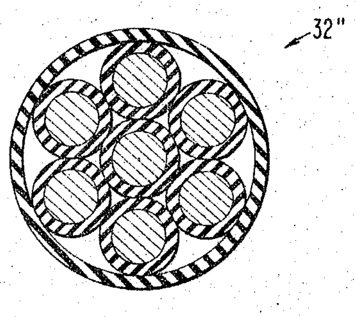
FIG. 10 is a cross-sectional view similar to that shown in FIG. 3 but which indicates insulator cladding surrounding the superconductor material rather than metallic cladding.

In FIGURE 10 of the drawing there is indicated the relationship of the insulator material, which may be made from silver chloride which can be easily drawn, to the lead core or filament when a bundle 32" is formed corresponding to the bundle 32 as found in FIGURE 3 of the drawing.

Table II, shown hereinbelow, discloses pertinent data derived from making in accordance with the present invention a composite wire having a lead filamentary structure with silver chloride shell.

TABLE II

| Draw | No. of filaments | Filament, diameter Å. | Volume, percent Pb. |
|---|---|---|---|
| I | 1 | $6\times10^5$ | 2.5 |
| II | 67 | $8.6\times10^4$ | 1.8 |
| III | 2,140 | $1.1\times10^4$ | 0.8 |
| IV | 43,000 | 350 | 0.35 |

It was found that after the third draw when the lead had a diameter of 11,000 angstrom units the critical field was approximately equal to that of bulk lead, as it should have been for such large filaments, and the measured susceptibility was within 5 percent of that calculated for the bulk lead contained therein. After the fourth draw the diameter of the lead filaments was 350 angstrom units and the critical field was in excess of 1400 gauss and the susceptibility was down by a factor of 105 over that of bulk lead. Thus, it was calculated that the critical magnetic field is increased by factor of $\sqrt{105}$ over bulk lead.

Although the composite wire produced with a superconductor filament and insulator shell produced very high magnetic field superconductors, it may be preferable to use a short mean free path nonsuperconducting shells and superconducting filaments each of which is made of metal or alloy in order to more readily make electrical contact with the ends of the composite high magnetic field superconducting wires of the present invention.

Accordingly, composite wires may be produced by the method of the present invention wherein aluminum zinc shells enclose lead bismuth filaments. Since both aluminum zinc and lead bismuth have a short normal state electron mean free path, this combination of alloys produces a synthetic alloy which not only will remain superconducting at substantially higher magnetic fields than will bulk lead bismuth but also will facilitate electrical connections thereto. It should be understood that the interaction between the core or filament and shell is not only controlled by the electron mean free path of the materials used but may also be controlled by proper selection of metal or alloys for the core filaments and the shell.

Accordingly, it can be seen that the present invention provides superconductor wires, formed of two metals, one of which is a superconducting metal, having superconducting properties which differ from the superconducting properties of the superconducting metal used therein, and also it can be seen that in accordance with this invention alloys are made of mutually insoluble metals.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconductor wire having a given critical magnetic field comprising:

(a) a plurality of superconductor filaments each made of a first material which is superconductive at a given critical temperature, said first material being the metal lead, (b) a plurality of shells made of a second material which remains in its normal state at said given temperature, said second material being the metal aluminum, said plurality of filaments being disposed within said plurality of shells, respectively, and (c) a common shell surrounding said plurality of shells, each of said filaments having a cross-sectional dimension at least approximately as small as the magnetic field penetration depth of said superconductor filaments.

2. A superconductor wire having a given critical magnetic field comprising:

(a) a plurality of superconductor filaments each made of a first material which is superconductive at a given critical temperature, said first material being an alloy of lead bismuth, (b) a plurality of shells made of a second material which remains in its normal state at said given temperature, said second material being an alloy of aluminum zinc, said plurality of filaments being disposed within said plurality of shells, respectively, and (c) a common shell surrounding said plurality of shells, each of said filaments having a cross-sectional dimension at least approximately as small as the magnetic field penetration depth of said superconductor filaments.

3. A superconductor wire having a given critical magnetic field comprising:

(a) a plurality of superconductor filaments each made of a first material which is superconductive at a given critical temperature, said first material being an alloy, (b) a plurality of shells made of a second material which remains in its normal state at said given temperature, said second material being an alloy, said plurality of filaments being disposed within said plurality of shells, respectively, and (c) a common shell surrounding said plurality of shells, each of said filaments having a cross-sectional dimension at least approximately as small as the magnetic field penetration depth of said superconductor filaments, said superconductor alloy and said other alloy being such that normal state electron mean free path both in said superconductor alloy and in said other alloy is short compared to said magnetic field penetration depth in said superconductor alloy.

4. A superconductor wire as set forth in claim 3 wherein said magnetic field penetration depth is at least as small as $10^4$ angstrom units.

5. A superconductor wire having a given critical magnetic field comprising:

(a) a plurality of superconductor filaments each made of a first material which is superconductive at a given critical temperature, said first material being lead, (b) a plurality of shells made of a second material which remains in its normal state at said given temperature, said second material being an insulator of silver chloride, said plurality of filaments being disposed within said plurality of shells, respectively, and (c) a common shell surrounding said plurality of shells, each of said filaments having a cross-sectional dimension at least approximately as small as the magnetic field penetration depth of said superconductor filaments.

References Cited

UNITED STATES PATENTS

| | | | |
|---|---|---|---|
| 3,109,963 | 11/1963 | Geballe | 335—216 X |
| 3,218,693 | 11/1965 | Allen. | |
| 3,293,008 | 12/1966 | Allen. | |

LEWIS H. MYERS, *Primary Examiner.*

E. GOLDBERG, *Assistant Examiner.*